United States Patent [19]

Ruderer

[11] 3,971,120

[45] July 27, 1976

[54] DIRECT-ON CERAMIC COATING OF CARBON-RICH IRON

[75] Inventor: Clifford G. Ruderer, Brecksville, Ohio

[73] Assignee: Ferro Corporation, Cleveland, Ohio

[22] Filed: Sept. 2, 1975

[21] Appl. No.: 608,961

Related U.S. Application Data

[63] Continuation-in-part of Ser. No. 535,441, Dec. 23, 1974, Pat. No. 3,923,611.

[52] U.S. Cl. .................................. 29/460; 29/195; 204/35 R; 204/38 C; 427/309; 427/330; 427/405; 427/419
[51] Int. Cl.² ...................... B23P 3/02; C25D 5/36; C25D 5/48; C23D 3/00
[58] Field of Search .......... 427/309, 330, 405, 419; 29/460, 195 M, 195 V; 228/193, 219; 204/38 C, 35 R

[56] References Cited

UNITED STATES PATENTS

| | | | |
|---|---|---|---|
| 2,351,811 | 6/1944 | Frank | 204/38 C |
| 2,639,264 | 5/1953 | Chester | 204/34 |
| 3,773,629 | 11/1973 | Sieckmann et al. | 204/38 C |
| 3,923,611 | 12/1975 | Ruderer | 204/35 R |

*Primary Examiner*—G. L. Kaplan
*Attorney, Agent, or Firm*—Milton L. Simmons; Wesley B. Taylor

[57] ABSTRACT

A process is disclosed for preparing an iron workpiece containing at least 0.03% by weight carbon for a direct-on, one-fire ceramic or enamel coat. A substantially continuous layer of substantially pure iron is pressure-bonded onto a surface of the carbon-rich iron workpiece. Thereafter, the workpiece and bonded iron layer are placed in an electroconducting liquid medium and, while using the workpiece as an anode, some of the deposited iron is electrolytically removed to produce an exposed, fissured, textured surface in the pure iron layer. When a ceramic coat is conventionally applied over the fissured surface, it adheres well, even though the iron workpiece may contain appreciable amounts of carbon which normally prevent such adherence for a direct-on ceramic coat. Optionally, the pressure-bonded layer may be followed by an electrodeposit of a porous, substantially pure iron layer prior to applying a ceramic coat.

25 Claims, No Drawings

DIRECT-ON CERAMIC COATING OF CARBON-RICH IRON

CROSS-REFERENCE TO RELATED APPLICATION

This application is a continuation-in-part of an application Ser. No. 535,441, filed Dec. 23, 1974, now U.S. Pat. No. 3,923,611.

BACKGROUND OF THE INVENTION

The preparation of the surface of steel or other iron-containing workpiece to receive a coat of ceramic (often also called enamel-coat or porcelain enamel) has presented a number of problems to the industry if a tightly adherent, defect-free ceramic coat is to be obtained. Preparation of iron-containing workpiece for enameling presently involves a long and fairly complex series of operations performed in both hot and cold solutions which require careful control of temperature, pH, and concentration.

In one practice, two ceramic coats are sequentially applied, the first being called a ground coat and the second, a cover coat. For each coat, it is necessary to use a special frit composition. Each frit composition is milled, dried, and after application to the metallic workpiece, each coat must in turn be fired.

In order to eliminate the ground coat application and all that it entails, so-called direct-on or a single application of an enamel or ceramic coat has been proposed. In this case, the application is limited to special and expensive grades of steel, such as zero carbon steel which may contain up to about 0.003 percent carbon. Further, it is necessary to etch the surface of such workpiece, as with sulfuric acid, as a preliminary step which ordinarily is more extensive than for a ground coat and cover coat application. For example, the acid etch may remove as much as 3.5 grams per square foot of zero carbon steel which is relatively expensive.

Not only does a workpiece previously designed for direct-on enameling require a more severe etch, but it also generally requires a heavier deposit of nickel to obtain adherence in the absence of the use of highly colored adherence oxides, such as cobalt oxides, found in ground coats. Since the higher carbon contents of steel like cold rolled steel result in unacceptable enamel defects if ground coats are omitted, these grades of steel have not been successfully used for direct-on ceramic or enamel coating. If a direct-on ceramic coat is attempted on a carbon-rich steel substrate, such as cold rolled steel, the resulting ceramic coat not only has poor adherence but is subject to fish scaling and reboiling defects. Bubbles, pits or specks almost inevitably develop in the surface of a single ceramic coat applied to such a substrate, marring its uniformity and texture. The ceramic coat is also more prone to chipping.

The art has previously attempted to adapt carbon-rich iron alloys for a direct-on or one-fire ceramic coat. In U.S. Pat. No. 2,819,207 to Shepard, for example, the disclosed important aspect of the process of that patent is said to be the provision of a finely divided coat of cobalt or nickel on a cleaned surface by means of an electrodeposition procedure. U.S. Pat. No. 3,078,180 to Zander et al. discloses a pickling and etching technique which includes closely controlled treatments of an enameling stock in solutions of ferric sulfate and sulfuric acid, so that scale and rust are effectively removed and fine grained, uniformly etched metal surface is said to be obtained.

SUMMARY OF THE INVENTION

The principal object of the present invention is to provide a process for preparing a carbon-rich, iron-containing workpiece, such as cold rolled steel, for a direct-on, one-fire ceramic coat operation in which the ceramic or enamel coat adheres well to the workpiece and is not subject to spalling, chipping, fish scaling, reboiling, and the like which have so often characterized other attempts to apply a direct-on ceramic coat to such carbon-rich substrates. A related object is to achieve adherence of a ceramic coat to an iron workpiece without conventional pickling or the use of hot solutions, or the use of adherence-promoting additives.

Prior attempts to enamel a carbon-rich iron workpiece have been directed to covering the iron surface with non-ferrous metals, such as nickel or cobalt. It has now been surprisingly found that iron itself can form a suitable barrier between the workpiece and a ceramic coat, if the iron is deposited in a substantially pure form and if the deposited iron layer is treated before applying the ceramic coat by electrolytically removing some of the iron to form a fissured surface.

In my application, Ser. No. 535,441, I disclose electrodepositing a substantially continuous layer of substantially pure iron onto a carbon-rich iron workpiece, such as cold rolled steel, from a liquid medium containing irons ions while using the workpiece as a cathode. Preferably, the iron is electrodeposited in a two-step operation; first, as a non-porous, dense layer, and then as a porous layer. The polarity of the electrodeposit is next reversed to remove some of the deposited iron and produce an exposed, fissured surface in the substantially continuous iron layer. Thereafter, a ceramic coat is conventionally applied. Because the ceramic coat encounters only the layer of substantially pure iron, the ceramic-iron metal interface behaves as though the entire workpiece were composed of pure iron or of very low carbon steel.

It has now been discovered that the initial deposition of a continuous iron layer onto a carbon-rich iron workpiece can be effected by pressure-bonding rather than by electrodeposition. If desired, the iron layer deposition may still be a two-step operation; first, as a non-porous layer achieved by pressure-bonding, and second, as a porous layer over the non-porous layer achieved by electrodeposition. The process of this invention is substantially otherwise the same as disclosed in application Ser. No. 535,441, including electrolytic removal of some of the deposited iron in either the one-step or two-step iron deposition to leave a fissured surface.

The simple step of depositing substantially pure iron on the workpiece replaces much of the prior preparation techniques, especially pickling and etching steps, which were usually performed at elevated temperatures. The present process therefore eliminates much of the work that was formerly undertaken to apply either a ground coat-cover coat application of a direct-on application of a ceramic coat.

Further improved results are obtained in the present invention if the electrolytic removal of some of the deposited iron is carried out in an acidic medium. The conjoint removal of iron and simultaneous etching action afforded by the acidic medium produce a more severly fissured surface which is even better adapted to receive a ceramic coat in a tight, adherent bond.

DESCRIPTION OF THE PREFERRED EMBODIMENTS

A representative series of steps of treatment for a workpiece, defining one form of the present process, includes:

1. Cleaning and degreasing.
2. Descaling.
3. Rinsing.
4. Pressure-bonding onto the workpiece a layer of substantially pure iron.
5. Increasing surface area of the deposited iron by electrolytic removal of some of the iron.
6. Rinsing at room temperature.
7. Applying flash coating of covering metal.
8. Rinsing at room temperature.
9. Drying.
10. Applying ceramic coat.

Only steps four and five are critical to the invention, and considerable variation is permissible in these steps as well as in the other non-critical steps. Considering these example steps in greater detail, steps one through three are designed merely to clean the surface of the carbon-rich workpiece. If the workpiece is already sufficiently clean to accept the pressure-bonding, steps one through three can be eliminated. Normally, however, a workpiece from stock contains oil, rust, scale, dirt, etc., spread over its surface.

The cleaning, degreasing, and descaling steps may be carried out singly or simultaneously by any suitable means including one or more of: washing with soap, aqueous solutions or alkaline agents such as alkali resinate or sodium orthosilicate, organic solvents, acid pickling, sand blasting, and anodic or cathodic cleaning and pickling in known, appropriate solutions. For example, in one cathodic pickling operation, the workpiece was treated with a 7 percent sulfuric acid aqueous solution at room temperatures (65° to 85°F) for 5 minutes at a current density of 66 amperes per square foot. The descaling operation was similar to the degreasing operation except that the workpiece was used as the anode. Thereafter, the workpiece was rinsed with tap water at room temperatures.

The pressure-bonding step 4 is critical to the invention. By the term "pressure-bonding" and forms thereof is meant the adherence of a substantially pure iron layer to a workpiece by pressure sufficient to introduce temporary plasticity to the surface of one of the mating parts and thereby obtain a metallurgical bond between the two parts which persists upon release of the pressure. Optionally, the pressure-bonding step is accomplished by heating at least one of the mating parts; and optionally also the bonding operation is carried out in a non-oxidizing atmosphere. A preferred form of pressure-bonding is roll-bonding, although modified forms of pressure-bonding, such as friction welding, may also be used.

The substantially pure iron layer deposited by pressure-bonding in accordance with the present invention may be prepared in any convenient manner. For example, the iron layer or foil may be separately produced by roll reduction of substantially pure iron sheets. Or the iron layer may be made by electrodeposition from ferrous chloride or other iron-plating solution. The iron is deposited on a rotating drum acting as a cathode and later peeled off, preferably as a continuous sheet. Such a foil can be produced in thicknesses varying from 0.001 inch to about 0.006 inch in thickness or from about 18 grams to about 110 grams per square foot.

The iron layer may be bonded to the workpiece by pressure alone in a solid state welding process, as by hydraulically operated rams. In this case, only that pressure need be used sufficient to impart a state of plasticity at the intersurface between the pressed parts. In some instances, either one or both of the bonding parts may be heated prior to the pressing operation to achieve more quickly the plastic state and/or to reduce the pressure otherwise required. The application of heat promotes diffusion between the mating surfaces of the parts to be bonded. Any temperature of heating up to the melting point of iron affords some advantage. Iron melts about 1535°C. Accordingly, while only a surface plasticity is required, any temperature from about room temperature to temperatures as high as about 1450°C is useful. Normally, however, higher temperatures are not used because of the difficulties in working at such temperatures. A more practical range of heating is from about 500° to about 800°C. As a rule of thumb, the iron may be heated until a reddish glow appears, followed by the pressing operation. Pressures employed are limited only by the apparatus of equipment used to carry out this step but usually lie in the range of about 100 psi to about 50,000 psi.

Although an oxide layer temds to break up on hot roll-bonding, at times the formation of an oxide film on the iron layer or workpiece makes a pressure-bonding operation more difficult. Oxidation of the parts prior to bonding, especially when preheating is used, can be substantially reduced or eliminated from the intersurface of the iron layer and workpiece by pressure-bonding in a non-oxidizing atmosphere. This can be accomplished by bonding in an enclosure which is evacuated or otherwise contains a non-oxidizing atmosphere, such as one of hydrogen, helium, argon, or the like.

Roll-bonding is the preferred form of pressure-bonding and preferably is preceeded by heating one or more of the iron layer and workpiece. Normally only the workpiece is heated. Both parts to be bonded are normally first cleaned as in an alkaline detergent solution, rinsed with warm water, and dried with warm dry air. Optionally, the surfaces to be bonded may also be abraded as with a rotating wire brush or by etching. After the cleaning steps, one or more of the parts may be heated to a desired temperature and then pressure-rolled together immediately. Examples of roll-bonding techniques that can be used are disclosed in U.S. Pat. Nos. 3,381,364 to Winter; 3,381,365 to Winter; and 3,632,456 to Alyea, the disclosures of which are hereby incorporated by reference.

As indicated, heating or preheating of the parts to be bonded is not necessary in order to effect a pressure-bond. Especially when the workpiece and iron layer have relatively small bonding areas, so-called friction welding can be used. Friction welding is a process in which the heat for welding is produced by conversion of mechanical energy to heat energy at the interface of the parts to be bonded without any external application of heat. Friction welds may be made by holding a non-rotating part in contact with a rotating part under constant or gradually increasing pressure until the interface reaches a welding temperature. The rotation of one part is then halted to complete the weld. The heat developed frictionally in this manner at the welding interface raises the temperature of the parts to be welded to values approaching the melting range. Welding then occurs under the influence of a pressure that is applied while the heated zone is in a plastic condition. Friction welding may be considered a solid-state welding process in which joining occurs at a temperature below the melting point of the work metal. Frictional wear removes irregularities from the joint surfaces and leaves clean, smooth surfaces heated to welding temperature.

Inertia welding which is similar to friction welding may also be used. Inertia welding employs the kinetic energy of a freely rotating flywheel for the heat needed to produce a weld. One part is clamped in a non-rotating holder and another part is clamped to a rotating flywheel-spindle assembly. After a drive motor accelerates the flywheel-spindle assembly to a predetermined speed, the motor is stopped. The surfaces to be welded are then brought together, and the kinetic energy of the freely rotating flywheel is rapidly converted to heat at the weld interface as axial pressure is applied. Similarly, flywheel friction welding can be used. This technique may be practiced with a machine in which mechanical energy is stored in, and released by, a flywheel in amounts predetermined and gaged by flywheel speed. The amount of energy released by the flywheel is determined by its speed when axial pressure is first applied, and by the speed at which a clutch disengages the flywheel spindle from a drive motor.

Optionally, electrical energy can be used as one means of raising the temperature of the parts to be bonded, using the resistance to passage of electric current through or between the parts as a heat source.

As a modification providing improved results, the iron layer is preferably deposited as a two-step operation in which an initial, dense, non-porous layer is deposited by pressure-bonding, and a porous substantially pure iron layer is then deposited thereover by electrodeposition, using the workpiece as a cathode. The reasons why a two-step operation offers improved results are not clearly known, but it is believed that the dense layer more effectively prevents migration of unwanted oxides, carbides, etc., through the iron layer to reach the subsequently applied ceramic coat with deleterious effects; while the outer porous layer has increased surface area which promotes better adhesion with a ceramic coat.

In general, the electrodepositing step forms a substantially continuous layer of substantially pure iron onto the pressure-bonded iron layer from a liquid medium containing iron ions while using the workpiece as a cathode. The obtaiaining of a substantially pure iron deposit is realized by depositing ions of the metal. The electroplating medium may be any liquid adapted to transport iron ions under an electromotive force and may include organic liquids such as benzene, xylene, higher molecular weight alcohols such as ethylene glycol, propylene glycol, and the like. However, the preferred liquid medium is water because of its ready availability, lack of toxicity, and its ability to serve as a solvent for many ionizable iron compounds.

Any iron compound which furnishes ions in the liquid medium may be used. For example, ionizable, water soluble iron salts may be used as iron sulfate, iron chloride, iron acetate, iron bromide, iron carbonate, iron iodide, iron nitrate, mixtures thereof, and the like. A concentration of the iron compound in the electroplating medium is not critical, since the time of deposition need only be varied until a sufficient amount of the substantially pure iron is deposited.

One technique that may be used to vary the porosity of the electrodeposited iron layer is to vary the density of the electroplating current. As an example, a porous layer can be deposited onto the pressure-bonded layer at a current density of about 40 amperes per square foot to about 100 amperes per square foot. When a dual iron layer is used as just described, the dense, non-porous layer and the porous layer are each deposited in the manner described at about two grams per square foot to about twelve grams per square foot of workpiece area. Use of hot electroplating solutions are of some value in reducing the times required to achieve an iron layer of desired thickness. However, it is an advantage of the present invention that it is possible to obtain good, acceptable results with respect to adherence of a ceramic coating when the electroplating solution is used at room temperatures.

Regardless of whether one or two coats of substantially pure iron are applied as described, it is necessary in order to obtain the results sought by the present invention to increase the surface area of the deposited iron layer by electrolytically removing some of it by placing the workpiece in an electroconducting medium and using the workpiece as an anode. As a rule, the current used is at such current densities and for such times as to remove about 1 grams to about 10 grams per square foot of the substantially pure iron layer. The electroconducting medium may be the same solution described for electrodepositing an iron layer, although still other electroconducting media or solutions can be used. The effect of current reversal is to promote formation of an exposed, fissured, roughened textured surface which is at least partly responsible for the good adherence of an after-applied ceramic coat. It is believed that the increase in surface area of the iron layer encourages formation of appreciable quantities of ferric iron which subsequently develop during initial stages of firing an after-applied ceramic coat. Other ferric compounds may also be formed at this time, such as hydroxides and sulfates. It is hypothesized that the presence of ferric iron helps to maintain the saturation of ferrous iron at the ceramic coat/metal interface needed for adherence by introducing a continuing supply of ferrous ions into the interface by a reaction with the workpiece as represented by the following:

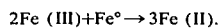

$$2Fe\ (III) + Fe^\circ \rightarrow 3Fe\ (II).$$

The electroconducting medium may be hot (over 80°F) during electrolytic removal of some of the iron layer, if desired, but it is an advantage of the present invention that acceptable results are possible even when the electroplating solution is used at room temperatures.

As a modification, the improved results have been noted if during electrolytic removal, the electroconducting medium or solution has an acid pH, for example, a pH from about 2 to about 6. A pH of 2 to 3 is preferred. The pH of the bath may be adjusted by adding any suitable material which does not introduce undesirable materials into the bath. Examples of such materials are sulfuric acid for reducing the pH, and iron powder for raising the pH. The reason why an acid pH improves the results is not entirely clear, but it is postulated that the formation of the fissured, textured surface is further enhanced by combining the electrolytic removal of some of the iron layer with a simultaneous acid etch of the layer. However, an acid etch by itself does not provide the desired results. The anodic removal of iron from the substantially pure iron layer is essential to satisfactory adherence of an after-applied ceramic coat.

The deposited iron layer obtained as above described (whether with one or two iron coats) serves two basic functions. First, the iron layer acts as a barrier between carbides and other reactive impurities in the underlying substrate of the workpiece and oxygen and oxidizing compounds present in the enamel which is later applied or in the atmosphere. In this manner, evolution of gaseous reaction products and defects in a ceramic coat normally produced thereby are prevented. Second, the preferably porous, electrolytically roughened, outermost surface of the iron layer provides a large surface area per unit area of the workpiece, thereby increasing the quantity of ferric-iron-containing oxide formed during the initial stages of firing.

As a further modification designed to improve results, a relatively thin coat of covering metal may be deposited over the substantially pure iron layer prior to applying a ceramic coat. The covering metal is not necessary to the invention and its usefullness in providing improved results becomes even less if a non-porous iron layer and porous overlay of another iron layer are used as previously described. Useful metals which may define the covering include nickel, cobalt, copper, and manganese. Nickel is preferred. The metal covering is relatively thin, resembling a flash coating, for example, up to about 0.3 gram per square foot and preferably about 0.03 gram to about 0.1 gram per square foot.

The metal covering may be applied to the iron layer in any convenient manner, preferably after water rinsing the workpiece following the step of increasing the surface area of the deposited iron layer. For example, the metal covering may be applied by a chemical replacement action (in accordance with the electromotive series) as from a hot nickel sulfate aqueous solution; or by reducing an unstable salt of the metal in an aqueous solution, for instance, a nickel-containing hypophosphite solution; or by electrodeposition as from an aqueous solution of a nickel salt, for example, a solution of nickel chloride or nickel sulfate. Electrolytic deposition is preferred. It is postulated that the covering metal further enhances formation of ferric oxide during subsequent firing to form a ceramic coat. Salts and particularly water soluble salts of the other disclosed metals, cobalt, copper, and manganese, can be similarly used.

After rinsing the workpiece following application of the covering metal, it may be suitably dried in any convenient manner, such as leaving it to dry in the open atmosphere, blowing warm air currents over the workpiece, heating it directly, and the like. The workpiece is now ready for application of a ceramic coat just as though it were low-carbon steel. The ceramic coat can be applied in a conventional manner and can comprise any known frit composition for steel. For example, the following may be used:

| Ingredient | Weight Percent |
|---|---|
| $SiO_2$ | 40 to 50 |
| $B_2O_3$ | 10 to 20 |
| $Na_2O$ | 5 to 10 |
| $K_2O$ | 5 to 10 |
| $TiO_2$ | 15 to 25 |
| $P_2O_5$ | 0 to 5 |
| $F_2$ | 0 to 5 |

The frit is directly applied to the substantially pure iron layer (or over the covering metal if one is used) such as from an aqueous slip, and then the workpiece is dried and fired, for example, at a temperature of about 1200° to about 1600°F, to fuse the frit particles and form a single ceramic coat. The coat is uniform and contains no pits or other defects. The ceramic coat has good adherence to the underlying metal surface.

EXAMPLE 1

Working Example

The following describes in detail one form of the present invention. A specimen of cold rolled steel plate was used containing 0.08% C, 0.35% Mn, 0.005% P, 0.025% S and the balance iron. The specimen measured 4 by 6 inches and had a thickness of about 0.03 inch. In place of the cold rolled steel, hot rolled, killed, semi-killed, rimmed steel and other less expensive, non-premium steels containing appreciable amounts of carbon in excess of at least 0.03% carbon could have been used.

The workpiece was cleaned and degreased electrolytically with an aqueous solution of 7 percent by weight sulfuric acid at room temperatures using the workpiece as a cathode. Electric current was applied at a density of 66 amperes per square foot for five minutes. For heavily soiled workpieces, this time may be extended as required. The workpice was next descaled using the same solution as for the cleaning and degreasing step but with the current reversed so that the workpiece was the anode. Current flow was maintained at 66 amperes per square foot for 5 minutes, after which the workpiece was rinsed with water at room temperatures in the absence of any electric current.

In this example both a dense, non-porous layer of iron and a porous layer of iron were used to define the substantially pure iron layer.

Initially, the workpiece could be heated in an oven to about 700°F to about 800°F and a leyr of substantially pure iron having a thickness of 0.006 inch placed over the 4 × 6 inches surface and pressed there against by a ram at a pressure of about 10,000 psi to effect a workpiece to layer bond. An overlay of a porous layer of substantially pure iron was next electrodeposited over the pressure-bonded layer from an aqueous solution maintained at room temperature and containing 40 grams per liter of $FeSO_4.7H_2O$ and 100 grams per liter $NH_4Cl$. The solution had a pH of 2 to 3. This electrodeposition was performed at a current density of 66 amperes per square foot for 5 minutes with the workpiece as a cathode.

The surface area of the exposed face of the porous iron layer was then increased by reversing the current to remove some of the electrodeposited iron. This operation was carried out using the same electroplating solution except that the workpiece was used as the anode. A current density of 36 amperes per square foot for 2 minutes was used.

After rinsing the workpiece with water at room temperatures in the absence of any electric current, a flash coating of nickel was electrodeposited over the porous iron layer using the workpiece as a cathode. The electroplating bath was maintained at room temperatures and comprised an aqueous solution of 75 grams per liter of $NiCl_2$ and 30 grams per liter of $NH_4Cl$. It had a pH of about 7. The current was applied at a density of 9 amperes per square foot for 30 seconds. After once more rinsing the workpiece with water at room temperatures in the absence of an electric current, the workpiece was dried to the touch by flowing warm air over the treated surface.

The workpiece was now ready for application of a ceramic coat. A frit compositon within the range previously disclosed was conventionally applied over the treated workpiece surface from an aqueous slip. The workpiece was then heated to evaporate the water, and then fired at a temperature of about 1400°F for about 3.5 minutes to about 4.5 minutes to fuse the frit and form a ceramic coat, after which the workpiece was removed from the furnace and allowed to cool.

EXAMPLES 2 THROUGH 11

When a two-step deposition of iron layers is followed and the second step is an electrodeposition as described, electrodeposition parameters, such as current density, deposition time, and other values as given in Example 1, may be controlled and varied to provide a consistent and reproducible surface for enameling by simple trial and error. The electroplating solution is not critical to the invention as long as iron ions are available for electrodeposition. The electroplating bath used in Example 1 can itself be varied as illustrated by Table A. Still other electroplating baths known in the art to yield deposits can be used.

TABLE A

| | Useful Iron Plating Baths | | | | | | |
|---|---|---|---|---|---|---|---|
| | Compound Concentration, g/l | | | Concentration of Ionic Species, g/l | | | |
| Example | $FeSO_4 \cdot 7H_2O$ | $NH_4Cl$ | $(NH_4)_2SO_4$ | $Fe^{2+}$ | $NH_4^{1+}$ | $Cl^{1-}$ | $SO_4^{2-}$ |
| 2 | 40 | 100 | — | 8.0 | 33.7 | 66.3 | 13.8 |
| 3 | 80 | 100 | — | 16.0 | 33.7 | 66.3 | 27.6 |
| 4 | 120 | 100 | — | 24.0 | 33.7 | 66.3 | 41.4 |
| 5 | 160 | 100 | — | 32.0 | 33.7 | 66.3 | 55.2 |
| 6 | 200 | 100 | — | 40.0 | 33.7 | 66.3 | 69.0 |
| 7 | 250 | 100 | — | 50.3 | 33.7 | 66.3 | 86.4 |
| 8 | 40 | 15 | 100 | 8.0 | 32.2 | 9.9 | 86.7 |
| 9 | 40 | 45 | 65 | 8.0 | 32.8 | 29.8 | 61.2 |
| 10 | 40 | 75 | 30 | 8.0 | 33.4 | 49.7 | 35.7 |
| 11 | 180 / 10 / 120 | $FeCl_2 \cdot 4H_2O$ / $Fe_2(SO_4)_3 \cdot xH_2O$ / $(NH_4)_2SO_4$ | — | 52.7 | 32.8 | 63.8 | 94.5 |

The present invention replaces virtually the entire relatively complex and costly metal preparation procedures now used, such as hot pickling, hot acid etching, and rinsing steps with a single electroplating bath maintained at room temperatures. Because an enamel or ceramic coat touches only the substantially pure layer of iron and not the actual substrate of the workpiece, direct-on ceramic coating of low cost grades of steel such as cold-rolled steel is practical. Savings are realized not only by the use of less expensive steel but by elimination as well of ground coat enamels.

Although the foregoing describes several embodiments of the present invention, it is understood that the invention may be practiced in still other forms within the scope of the following claims.

I claim:

1. In a process for the direct-on, ceramic coating of a carbon-rich, iron workpiece, the improvements prior to depositing the ceramic coat of:

a. pressure-bonding a substantially continuous layer of substantially pure iron onto said carbon-rich iron workpiece,
   b. placing the workpiece and bonded iron layer in an electroconducting liquid medium, and
   c. electrolytically removing some of the deposited iron using the workpiece as an anode to produce an exposed, fissured surface in said substantially continuous layer.

2. The process of claim 1 in which said iron workpiece contains at least 0.03 percent by weight of carbon.

3. The process of claim 1 in which said iron workpiece is cold rolled steel.

4. The process of claim 1 in which said liquid medium is an electroconducting aqueous solution and has an acidic pH to provide a metal etch simultaneously with said metal removal.

5. The process of claim 1 in which said layer of substantially pure iron has a weight of about 18 grams per square foot to about 110 grams per square foot.

6. The process of claim 1 in which step (b) removes from said layer of substantially pure iron an amount of about 1 gram per square foot to about 10 grams per square foot.

7. The process of claim 1 in which step (a) comprises first pressure-bonding a non-porous layer of substantially pure iron, and then electrodepositing thereover a porous layer of substantially pure iron.

8. The process of claim 1 in which step (a) comprises first pressure-bonding a non-porous layer of substantially pure iron, and then electrodepositing thereover a porous layer of substantialaly pure iron at a current density of about 40 amperes per square foot to about 100 amperes per square foot.

9. The process of claim 1 including applying a film of a covering metal onto said fissured surface.

10. The process of claim 9 in which said covering metal is nickel.

11. The process of claim 9 in which said covering metal is selected from the group consisting of nickel, cobalt, copper and manganese.

12. The process of claim 1 in which said pressure-bonding includes heating at least one of said layer of substantially pure iron and said iron workpiece, and then pressing the layer and workpiece together to effect said bond.

13. The process of claim 1 in which said pressure-bonding includes heating at least one of said layer of substantially pure iron and said iron workpiece in a non-oxidizing atmosphere to a temperature within the range of from about room temperature to about 1450°C, and then pressing the layer and workpiece together to effect said bond.

14. The process of claim 1 in which said pressure-bonding includes heating at least one of said layer of substantially pure iron and said iron workpiece in a non-oxidizing atmosphere to a temperature within the range of from about room temperature to about 1450°C, and then pressing the layer and workpiece together in a non-oxidizing atmosphere with a force of about 100 psi to about 50,000 psi to effect said bond.

15. The process of preparing an iron workpiece containing at least 0.03 percent by weight of carbon for direct-on ceramic coating without the use of an intermediate ceramic ground coat, comprising:
 a. pressure-bonding onto said workpiece a dense, non-porous layer of substantially pure iron in an amount of about 18 grams per square foot to about 110 grams per square foot,
 b. electrodepositing over said dense layer a porous layer of substantially pure iron in an amount of about 2 grams per square foot to about 12 grams per square foot from an aqueous electroplating bath containing iron ions, while using the workpiece as a cathode,
 c. reversing the polarity of the electrodeposit to remove some of the deposited iron in an amount of about 1 gram per square foot to about 10 grams per square foot to produce an exposed fissured, textured surface in the continuous layer, and
 d. then forming a ceramic coat on said fissured, textured surface.

16. The process of claim 15 in which said iron workpiece is cold rolled steel.

17. The process of claim 15 in which said aqueous electroplating bath has a pH of about 2 to about 6.

18. The process of claim 15 including applying a film of a covering metal onto said fissured surface prior to forming a ceramic coat.

19. The process of claim 18 in which said covering metal is nickel.

20. The process of claim 18 in which said covering is selected from the group consisting of nickel, cobalt, copper and manganese.

21. The process of claim 15 in which the electrodeposition of step (b) is carried out at a current density of about 40 amperes per square foot to about 100 amperes per square foot.

22. The process of claim 15 in which forming a ceramic coat comprises depositing a dispersion of ceramic particles on said surface and then firing to fuse the particles and form a ceramic coat.

23. The process of claim 15 in which said pressure-bonding includes heating at least one of said non-porous layer of substantially pure iron and said iron workpiece, and then pressing the layer and workpiece together to effect said bond.

24. The process of claim 15 in which said pressure-bonding includes heating at least one of said non-porous layer of substantilly pure iron and said iron workpiece in a non-oxidizing atmosphere to a temperature within the range of about room temperature to about 1450°C, and then pressing the layer and workpiece together to effect said bond.

25. The process of claim 15 in which said pressure-bonding includes heating at least one of said non-porous layer of substantially pure iron and said iron workpiece in a non-oxidizing atmosphere to a temperature within the range of about room temperature to about 1450°C, and then pressing the layer and workpiece together in a non-oxidizing atmosphere with a force of about 100 psi to about 50,000 psi to effect said bond.

* * * * *